(12) United States Patent
Richard

(10) Patent No.: US 7,165,523 B1
(45) Date of Patent: Jan. 23, 2007

(54) SYSTEM, IN PARTICULAR FOR MOTOR VEHICLE STARTING A HEAT ENGINE AND FOR CHARGING AN ELECTRIC CIRCUIT

(75) Inventor: Daniel Richard, Marolles En Brie (FR)

(73) Assignee: Valeo Equipements Electriques Moteur, Creteil (FR)

( * ) Notice: Subject to any disclaimer, the term of this patent is extended or adjusted under 35 U.S.C. 154(b) by 947 days.

(21) Appl. No.: 09/787,952

(22) PCT Filed: Aug. 4, 2000

(86) PCT No.: PCT/FR00/02245

§ 371 (c)(1),
(2), (4) Date: Mar. 23, 2001

(87) PCT Pub. No.: WO01/11231

PCT Pub. Date: Feb. 15, 2001

(30) Foreign Application Priority Data

Aug. 9, 1999 (FR) .................................... 99 10316

(51) Int. Cl.
*F02N 11/04* (2006.01)

(52) U.S. Cl. ...................... 123/179.3; 290/31
(58) Field of Classification Search ............ 123/179.3, 123/179.4, 179.28; 290/31
See application file for complete search history.

(56) References Cited

U.S. PATENT DOCUMENTS 5,601,058 A * 2/1997 Dyches et al. ........... 123/179.3
6,018,199 A * 1/2000 Shiroyama et al. ....... 290/37 A
6,032,632 A * 3/2000 Bolenz et al. ........... 123/179.3

FOREIGN PATENT DOCUMENTS

| EP | 0391386 | 10/1990 |
|---|---|---|
| FR | 2526087 | 11/1983 |
| FR | 2745444 | 8/1997 |

* cited by examiner

Primary Examiner—Andrew M. Dolinar
(74) Attorney, Agent, or Firm—Berenato, White & Stavish

(57) ABSTRACT

System, especially for a motor vehicle, able, on the one hand, to start up an internal-combustion engine and, on the other hand, to charge an electrical circuit, including a main electrical machine able to operate, on the one hand, as a generator and, on the other hand, as an electric motor, the said electrical machine driving the internal-combustion engine by means of a belt when it is operating in motor mode, the system further including management means which drive the main electrical machine, characterised in that it includes a supplementary starter, as well as means for detecting at least one condition for triggering the activation of the said supplementary starter, and the management means drive the main electrical machine and the starter, according to a particular sequence, when the said condition is detected by the said detection means.

7 Claims, 2 Drawing Sheets

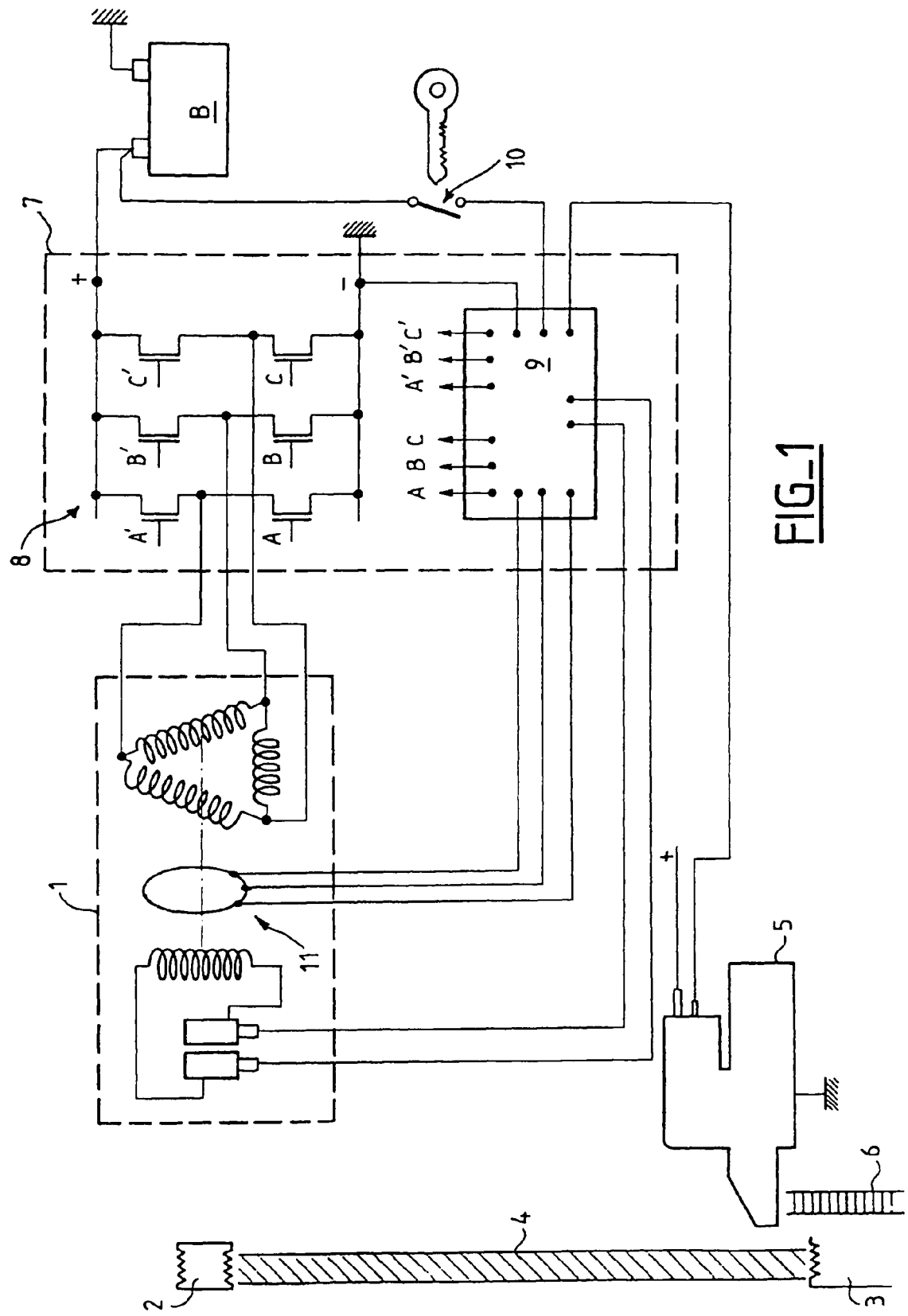
FIG_1

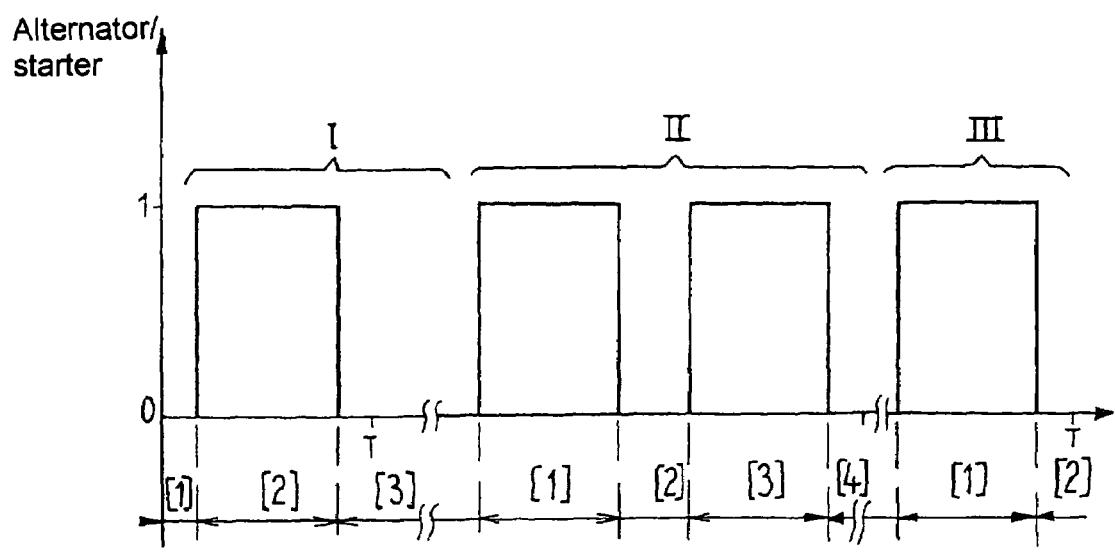
FIG_2a
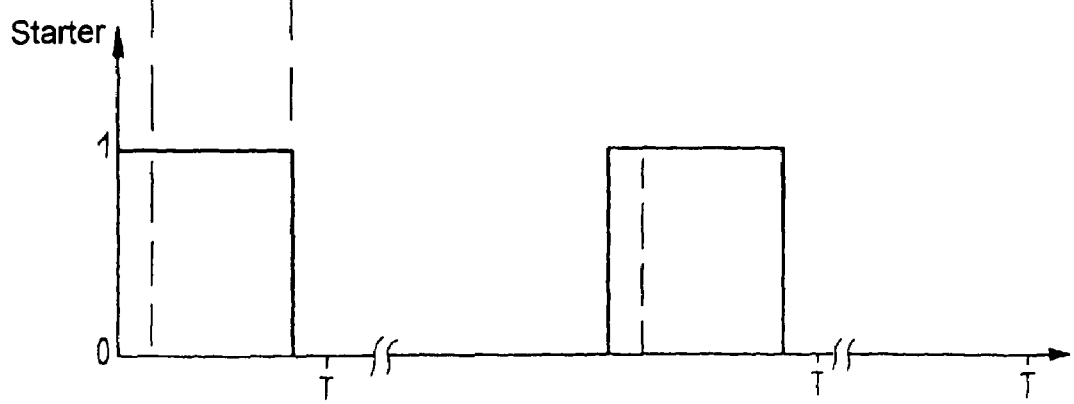
FIG_2b

SYSTEM, IN PARTICULAR FOR MOTOR VEHICLE STARTING A HEAT ENGINE AND FOR CHARGING AN ELECTRIC CIRCUIT

The present invention relates to the systems, especially for motor vehicles, which, on the one hand, start up an internal-combustion engine and, on the other hand, charge an electrical circuit.

It also relates to the control of such a system.

On motor vehicles, the internal-combustion engine is usually started by a starter, while the charging of the battery and the power supply to the consumer units is undertaken by an alternator.

It has already been proposed to carry out these two functions by means of an alternator used both as generator and as electric motor. Such an electrical machine which carries out the two functions at the same time is currently designated by the name of alternator/starter.

For a presentation of such a machine, reference may advantageously be made to the patent FR 2 745 444.

This machine is generally arranged in place of the alternator. In motor mode, it drives the pulley of the crankshaft by means of the belt which is also used in generator mode. It is then spoken of as an alternator/starter of separate type, as opposed to alternator/starter machines which would drive the internal-combustion engine directly by means of a pinion meshing with a ring gear.

The alternator/starters of separate type exhibit certain drawbacks, when operating in motor mode.

Especially under certain extreme conditions, particularly at low temperature, the internal-combustion engine offers a substantial resisting torque which can prevent satisfactory driving via the belt.

Likewise, separate alternator/starters do not allow for rapid starting in all cases. The starting time can be relatively lengthy, especially if the internal-combustion engine is experiencing injection problems, or else because of the fact that the belt is slipping, etc.

However, it is desirable for the starting-up of a vehicle to be able to be carried out in relatively short times, in particular when the on-board computer of the vehicle implements a mode of operation, for the internal-combustion engine, with automatic cut-off and restarting of the internal-combustion engine when the vehicle is stopped (operation of "stop & go" type, according to the terminology usually used by the person skilled in the art).

The invention, for its part, proposes a starting and charging system and a drive which makes it possible to remedy these drawbacks.

More particularly, the invention relates to a system, especially for a motor vehicle, able, on the one hand, to start up an internal-combustion engine and, on the other hand, to charge an electrical circuit, including a main electrical machine able to operate, on the one hand, as a generator and, on the other hand, as an electric motor, the said electrical machine driving the internal-combustion engine by means of a belt when it is operating in motor mode, the system further including management means which drive the main electrical machine.

The said system is such that it includes a supplementary starter, as well as means for detecting at least one condition for triggering the activation of the said supplementary starter, and the management means drive the main electrical machine and the starter, according to a particular sequence, when the said condition is detected by the said detection means.

Thus the system includes supplementary starting means (the starter) which, when a condition requiring them to be activated is detected, supplements the main electrical machine, according to a synchronised operation, with that of the said machine.

Moreover, such a system is advantageously supplemented by the various characteristics below, taken alone or in all their technically possible combinations:
- the said detection means include at least one temperature sensor, as well as means for comparing a temperature measured by the said sensor with a particular low threshold.
- the detection means include means for detecting a failure to start at the end of a given time during which the main electrical machine is operating in motor mode.
- the management means include means for actuating the supplementary starter, when a condition for activating the supplementary starter is detected, in such a way that its pinion meshes on a complementary ring in order to drive the internal-combustion engine, in order to drive the main electrical machine in motor mode, when the pinion of the starter has been meshed and in order to cut off the starter and drive the main electrical machine in generator mode when it is detected that the internal-combustion engine has started.
- the management means include means for cutting off the operation of the main electrical machine in motor mode, when a condition for activation of the supplementary starter is detected.

The invention also relates to a method for control of a system, especially for a motor vehicle, able, on the one hand, to start up an internal-combustion engine and, on the other hand, to charge an electrical circuit, including a main electrical machine able to operate, on the one hand, as a generator and, on the other hand, as an electric motor, the said electrical machine driving the internal-combustion engine by means of a belt when it is operating in motor mode, according to which, with the said system including a supplementary starter, at least one condition for triggering the activation of the said supplementary starter is detected, and the main electrical machine and the starter are driven according to a particular sequence when the said condition is detected.

Such a method is advantageously supplemented by the various technical characteristics below, taken alone or according to all their technically possible combinations:
- in order to detect a triggering condition, at least one temperature is measured and a temperature thus measured is compared with a particular low threshold.
- in order to detect a triggering condition, a failure to start is detected at the end of a given time during which the main electrical machine is operating in motor mode.
- when a condition for activating the supplementary starter is detected, the supplementary starter is actuated in such a way that its pinion meshes on a complementary ring in order to drive the internal-combustion engine, the main electrical machine is put into motor mode, when the pinion of the starter has been meshed, and the starter is cut off and the main electrical machine is placed into generator mode when it is detected that the internal-combustion engine has started.
- the operation of the main electrical machine in motor mode is cut off when a condition for activation of the supplementary starter is detected.

Other characteristics and advantages of the invention will emerge further from the description which follows, which is purely illustrative and non-limiting, and which should be read with regard to the attached drawings, in which:

FIG. 1 is a diagram illustrating a system according to one possible embodiment of the invention;

FIGS. 2a and 2b are timing graphs on which have been plotted examples of possible power-supply sequences for the alternator/starter and the supplementary starter of the system of FIG. 1. The starting and charging system shown in FIG. 1 consists of:

a separate alternator/starter 1, the shaft of which terminates in a pulley 2 which is linked to a pulley 3 of the crankshaft by way of a multi-groove belt 4; this alternator/starter is mounted in the space which the alternator usually takes up;

a supplementary starter 5, the pinion of which can mesh with the toothing of a crown ring 6 in order to drive the shaft of the internal-combustion engine;

drive electronics 7.

The drive electronics 7 consist of:

a transistor bridge 8 which constitutes a reversible power converter, and which provides drive in starter mode and synchronous rectification in alternator mode.

a management module 9 which drives the various transistors of the converter 8 and manages the following different functions:

power in starter and alternator modes regulation in alternator mode transition from the starter mode to the alternator mode operating strategy for extreme conditions synchronisation of the two machines.

To that end, the said management module 9 is supplied with the voltage from the battery, referenced by B, to which it has been linked by way of a contact breaker 10 of the vehicle.

It receives information as input, allowing it to determine the angular position of the rotor of the alternator/starter 1, for example information supplied by sensors 11, such as Hall-effect sensors 11.

As output, it supplies the inductor of the alternator/starter 1 as well as the starter 5, and generates the voltages injected onto the gates (A, B, C; A', B', C') of the transistors of the bridge 8.

FIGS. 2a and 2b illustrate three sequences of power supply for the alternator/starter 1 and for the starter 5, corresponding to three different operating cases. These three power-supply sequences have been referenced by I, II and III.

The sequence I corresponds to the power supply which is applied when it is detected that the internal-combustion engine and the starting system are in extreme operating conditions.

The detection of the extreme conditions is done by means, for example, of one or more temperature sensors (not represented in FIG. 1) which are linked to the management module 9, the latter performing a comparison of the measured temperature or temperatures with one or more given thresholds. The threshold or thresholds are, for example, functions of the characteristics of the internal-combustion engine.

When these extreme operating conditions are detected, the management module 9 then drives the alternator/starter 1 and the starter 5 according to the following sequence.

In a first phase (phase [1] in FIG. 2), the starter 5 is supplied with power. Its drive pinion moves and meshes on the toothed ring 6 of the transmission of the internal-combustion engine.

In a second phase, once engagement is assured, the alternator/starter is driven in motor mode (phase [2]).

When the starting of the internal-combustion engine has been detected, the drive pinion of the starter 5 is made to disengage, while the alternator/starter 1 is switched over into generator mode (phase [3]).

Outside extreme operating conditions, it may happen that the starting invoked by the alternator/starter 1 does not happen sufficiently quickly.

In order to remedy this failure, the management module 9 controls the power supply to the alternator/starter and the starter 5 in the following way (sequence II).

When the closure of the switch 10 calls for starting, the module 9 supplies power to the inductor of the alternator/starter 1 so that it operates in motor mode, while the starter 5 is not called on (phase [1]).

If the internal-combustion engine has still not started at the end of a time T, the power supply to the alternator/starter 1 is shut off, then the supplementary starter 5 is started up, so that its meshing pinion advances, then meshes with the toothed ring 6 (power-supply phase [2]).

After meshing occurs, the alternator/starter 1 is again powered in motor mode (power-supply phase [3]).

When the starting of the internal-combustion engine has been detected, the drive pinion of the starter 5 is disengaged, while the alternator/starter 1 is driven as a generator (phase [4]).

Under normal operating conditions, that is to say if no particular set-point value has been detected (low temperature, start-up duration exceeded, etc.), the power supply to the alternator/starter 1 and to the starter 5 is managed according to sequence III.

The alternator/starter 1 is initially driven in motor mode (phase [1]); when the starting of the internal-combustion engine has been detected, generator mode (phase [2]) is entered. For its part, the starter 5 is not activated.

The invention claimed is:

1. System for a motor vehicle, able, on the one hand, to start up an internal-combustion engine and, on the other hand, to charge an electrical circuit, including a main electrical machine able to operate, on the one hand, as a generator and, on the other hand, as an electric motor, said electrical machine driving the internal-combustion engine by means of a belt when said main electrical machine is operating in motor mode, the system further comprises a management means which drive the main electrical machine, further comprising a supplementary starter, as well as means for detecting at least one condition for triggering activation of said supplementary starter, and the management means drive the main electrical machine and the starter, according to a particular sequence, when said condition is detected by said detection means, wherein the management means include means for actuating the supplementary starter, when a condition for activating the supplementary starter is detected, in such a way that its pinion meshes on a complementary ring in order to drive the internal-combustion engine, in order to drive the main electrical machine in motor mode, when the pinion of the starter has been meshed and in order to cut off the starter and drive the main electrical machine in generator mode when it is detected that the internal-combustion engine has started and the management means include means for cutting off the operation of the main electrical machine in motor mode, when a condition for activation of the supplementary starter is detected.

2. System according to claim 1, wherein said detection means include at least one temperature sensor, as well as means for comparing a temperature measured by said sensor with a particular low threshold.

3. System according to claim 1, wherein the detection means include means for detecting a failure to start at the end of a given time during which the main electrical machine is operating in motor mode.

4. System according to claim 2, wherein the detection means include means for detecting a failure to start at the end of a given time during which the main electrical machine is operating in motor mode.

5. Method for control of a system, especially for a motor vehicle, able, on the one hand, to start up an internal-combustion engine and, on the other hand, to charge an electrical circuit, including a main electrical machine able to operate, on the one hand, as a generator and, on the other hand, as an electric motor, said main electrical machine driving the internal-combustion engine by means of a belt when it is operating in motor mode, wherein said system further comprises a supplementary starter, wherein at least one condition for triggering activation of said supplementary starter is detected, and the main electrical machine and the starter are driven according to a particular sequence when said at least one condition is detected, when said at least one condition for activation the supplementary starter is detected, the supplementary starter is actuated such that its pinion meshes on a complementary ring in order to drive the internal-combustion engine, the main electrical machine is put into motor mode, when the pinion of the supplementary starter has been meshed, and the supplementary starter is cut off and the main electrical machine is placed into generator mode when it is detected, and that the internal-combustion engine has started and the operation of the main electrical machine in motor mode is cut off when at least one condition for activation of the supplementary starter is detected.

6. Method according to claim 5, wherein in order to detect a triggering of said at least one condition, at least one temperature is measured and said at least one temperature is compared with a particular low threshold.

7. Method according claim 5, wherein in order to detect a triggering condition, a failure to start is detected at the end of a given time during which the main electrical machine is operating in motor mode.

* * * * *